(12) United States Patent
Barrera et al.

(10) Patent No.: US 11,661,963 B2
(45) Date of Patent: May 30, 2023

(54) SERVICEABLE ROTATING MAGNETIC PIN

(71) Applicant: GM Global Technology Operations LLC, Detroit, MI (US)

(72) Inventors: Alejandro Barrera, Metepec (MX); Carlos Nava, Metepec (MX); Jesus Edgar Dominguez, Morelos (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 206 days.

(21) Appl. No.: 17/225,417

(22) Filed: Apr. 8, 2021

(65) Prior Publication Data

US 2022/0325734 A1    Oct. 13, 2022

(51) Int. Cl.
*F16B 5/06* (2006.01)
*B60R 13/02* (2006.01)
*F16B 1/00* (2006.01)

(52) U.S. Cl.
CPC .......... *F16B 5/065* (2013.01); *B60R 13/0206* (2013.01); *F16B 2001/0035* (2013.01); *F16B 2005/0671* (2013.01)

(58) Field of Classification Search
CPC .............. F16B 5/065; F16B 2001/0035; F16B 2005/0671; F16B 5/123; F16B 5/0657; B60R 13/0206
See application file for complete search history.

(56) References Cited

U.S. PATENT DOCUMENTS

| 10,995,783 | B2* | 5/2021 | Dickinson | F16B 5/0657 |
| 2008/0201914 | A1* | 8/2008 | Turner | F16B 5/123 |
| | | | | 24/289 |
| 2010/0289288 | A1* | 11/2010 | Smith | F16B 47/00 |
| | | | | 296/35.1 |
| 2011/0140474 | A1* | 6/2011 | Smith | B62D 27/06 |
| | | | | 296/35.1 |
| 2012/0261942 | A1 | 10/2012 | Benedetti | |
| 2014/0001321 | A1* | 1/2014 | Huelke | B60R 13/0206 |
| | | | | 248/206.5 |
| 2015/0135484 | A1* | 5/2015 | Leverger | F16B 13/045 |
| | | | | 24/292 |

(Continued)

FOREIGN PATENT DOCUMENTS

| CN | 107117111 A | 9/2017 |
| CN | 112292813 A | 1/2021 |

*Primary Examiner* — David M Upchurch
(74) *Attorney, Agent, or Firm* — Vivacqua Crane PLLC

(57) ABSTRACT

A magnetic pin system includes a magnetic pin having a polymeric body including: a seating portion; a cylindrical-shaped insert portion integrally fixed to the seating portion; and a first locking wing and a second locking wing oppositely positioned about the insert portion with respect to the first locking wing and integrally connected to the insert portion. A metallic insert is fixed to the seating portion. The metallic insert is susceptible to a magnetic field applied to the metallic insert acting to co-rotate the metallic insert and the polymeric body to install and to remove the polymeric body from a fixed position. A magnetic coupler is positioned over the metallic insert and magnetically coupled to the metallic insert. The magnetic coupler is rotated to induce a 90-degree rotation of the magnetic coupler and thereby the metallic insert to lock the magnetic pin in the fixed position.

19 Claims, 4 Drawing Sheets

(56) References Cited

U.S. PATENT DOCUMENTS

| | | | |
|---|---|---|---|
| 2015/0283957 A1* | 10/2015 | Dickinson | B60R 13/0206 |
| | | | 24/303 |
| 2017/0002853 A1* | 1/2017 | Huet | F16B 5/0657 |
| 2017/0051780 A1* | 2/2017 | Dickinson | F16B 21/076 |
| 2019/0161124 A1* | 5/2019 | Ortega Garcia | B62D 27/02 |
| 2019/0271343 A1* | 9/2019 | Perez Hernandez | F16B 21/12 |
| 2019/0344728 A1* | 11/2019 | Vargas Linan | F16B 1/00 |

* cited by examiner

SERVICEABLE ROTATING MAGNETIC PIN

INTRODUCTION

The present disclosure relates to automobile vehicle fasteners to retain trim and airbag components.

Automobile vehicle passenger compartment components such as trim members must be attached such that the components are retained in the event of vehicle rapid deceleration such as when an airbag is deployed. Partial detachment is also a potential failure mode of front-loaded components or for a subsystem during or after a side impact event or airbag static deployment. In order to prevent such failure modes, the components are attached using different strategies which involve the use of high retention (HR) fasteners such as HR trim-clips, 2 step trim-clip, HR birdbeaks, and threaded fasteners. Welding of the components has also been used. High retention fasteners and welded attachment components have limited capability however to allow serviceability or part replacement for serviceability or if damage occurs and therefore when a complete assembly is uninstalled to remove the component.

Thus, while current fastening systems for connecting components including trim members to automobile vehicle structure achieve their intended purpose, there is a need for a new and improved system and method for installing components onto automobile vehicle structural members.

SUMMARY

According to several aspects, a magnetic pin includes a polymeric body including: a seating portion; a cylindrical-shaped insert portion integrally fixed to the seating portion; and a first locking wing and a second locking wing oppositely positioned about the insert portion with respect to the first locking wing and integrally connected to the insert portion. A metallic insert is fixed to the seating portion. The metallic insert is susceptible to a magnetic field applied to the metallic insert acting to co-rotate the metallic insert and the polymeric body to install and to remove the polymeric body to and from an in-use position.

In another aspect of the present disclosure, the first locking wing and the second locking wing include a seating surface oriented parallel to and spaced from the seating portion by a tubular section of the insert portion.

In another aspect of the present disclosure, a circular-shaped raised ring extends outwardly from the tubular section.

In another aspect of the present disclosure, the insert portion, the first and second locking wings, the tubular section, the raised ring and the seating portion are integrally connected as a co-molding of a polymeric material.

In another aspect of the present disclosure, a lock spring defines a first segment of the seating portion, the lock spring elastically deflecting during contact of a seating face of the seating portion with a vehicle structural member to engage the seating portion against the vehicle structural member.

In another aspect of the present disclosure, a positioning spring defines a second segment of the seating portion, the positioning spring elastically deflecting to engage the seating portion during contact of a contact face of the seating portion with a doghouse face.

In another aspect of the present disclosure, a flexible, umbrella-shaped apron is made of a polymeric material and seats against the seating portion and opens toward the first and second locking wings.

In another aspect of the present disclosure, the first and second locking wings are oppositely arranged on the insert portion with respect to a longitudinal central axis of the magnetic pin, with the central axis also defining an insertion axis of the magnetic pin.

In another aspect of the present disclosure, the metallic insert incudes a male attachment member received in a distal end of the insert portion, the male attachment member including a frictional feature including one of raised ribs, multiple teeth and raised rings which fixedly couple the male attachment member and thereby the metallic insert to the insert portion.

In another aspect of the present disclosure, the metallic insert is a metal having magnetic properties such as but not limited to a carbon steel and a nickel material.

According to several aspects, a magnetic pin system includes a magnetic pin having a polymeric body including: a seating portion; a cylindrical-shaped insert portion integrally fixed to the seating portion; and a first locking wing and a second locking wing oppositely positioned about the insert portion with respect to the first locking wing and integrally connected to the insert portion. A metallic insert is fixed to the seating portion. The metallic insert is susceptible to a magnetic field applied to the metallic insert acting to co-rotate the metallic insert and the polymeric body to install and to remove the polymeric body from a fixed position. A magnetic coupler is positioned over the metallic insert and magnetically coupled to the metallic insert. The magnetic coupler is rotated to induce a 90-degree rotation of the magnetic coupler and thereby the metallic insert to lock the magnetic pin in the fixed position.

In another aspect of the present disclosure, the magnetic pin is seated in a doghouse, with the doghouse fixed to a component.

In another aspect of the present disclosure, a cavity of the doghouse is sized to frictionally restrict removal of the metallic insert when the metallic insert is received in the cavity of the doghouse to frictionally couple the metallic insert to the doghouse.

In another aspect of the present disclosure, a combination of the magnetic pin and the doghouse are moved in an installation direction, with the magnetic pin moved until the seating face of the seating portion directly contacts a member face of the vehicle structural member defining a pre-installed position of the magnetic pin.

In another aspect of the present disclosure, in the pre-installed position of the magnetic pin the first and second locking wings slidably extend into an elongated portion of an obround slot created in the vehicle structural member.

In another aspect of the present disclosure, a magnetic coupler is positioned over the metallic insert and magnetically coupled to the metallic insert, the magnetic coupler being rotated by operation of an electric motor inducing a 90-degree rotation of the magnetic coupler and thereby the metallic insert.

In another aspect of the present disclosure, a seating surface of the first and second locking wings, wherein rotation of the metallic insert rotates the first and second locking wings until the seating surface directly contacts a member face of the vehicle structural member to position the magnetic pin in a locked position.

According to several aspects, a method to couple an automobile vehicle component to a vehicle structural member includes: molding a magnetic pin having a polymeric body including a seating portion and a cylindrical-shaped insert portion integrally fixed to the seating portion; oppositely positioning a first locking wing and a second locking wing about the insert portion with the first locking wing and the second locking wing integrally connected to the insert portion; fixing a metallic insert to the seating portion; inserting the insert portion into an aperture formed in a vehicle structural member; and positioning a magnetic coupler over the metallic insert to magnetically couple the magnetic couple to the metallic insert; rotating the magnetic coupler to induce a 90-degree rotation of the magnetic coupler and thereby to induce a 90-degree rotation of the first locking wing and the second locking wing to lock the magnetic pin to the vehicle structural member.

In another aspect of the present disclosure, the method further includes fixing a doghouse to a vehicle component, the doghouse having a cavity.

In another aspect of the present disclosure, the method further includes inserting the metallic insert into the cavity of the doghouse to couple the magnetic pin to the vehicle component prior to the inserting operation.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
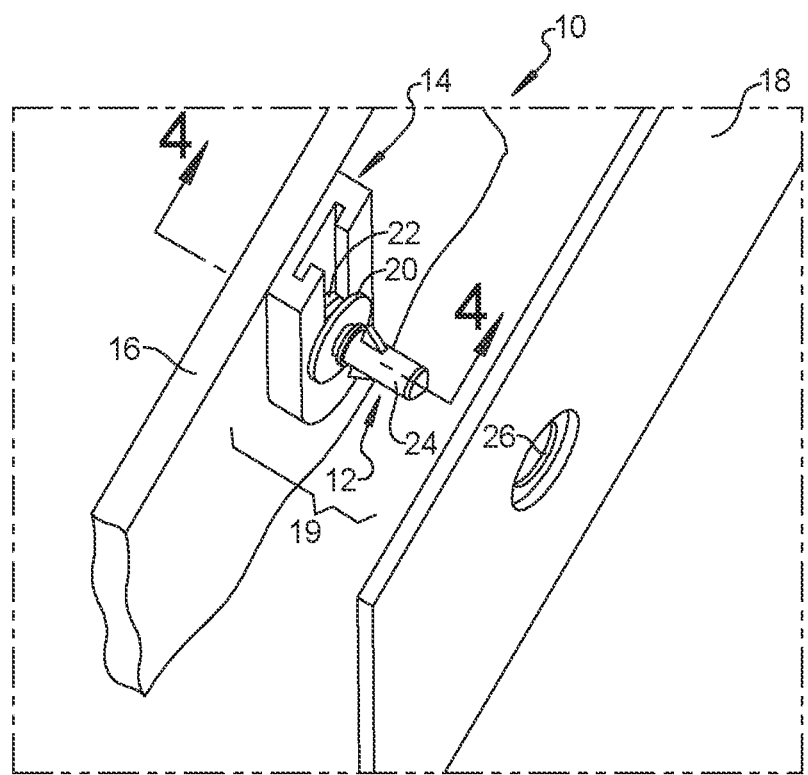
FIG. 1 is a top right perspective view of an assembly of a magnetic pin, a doghouse fixed to a vehicle component, and a vehicle structural member according to an exemplary aspect.

Referring to FIG. 1, a serviceable rotating magnetic pin assembly 10 used in automobile vehicles has a magnetic pin 12 seated in a doghouse 14, with the doghouse 14 fixed to a component 16. The component 16 defines an automobile vehicle component which may include but is not limited to a trim member, an airbag cover, a switch, and the like. The magnetic pin 12 is applied by rotating the magnetic pin 12 to releasably fix the component 16 to a vehicle structural member 18. The magnetic pin 12 includes a polymeric body 19 including a seating portion 20 which directly contacts the vehicle structural member 18. A metallic insert 22 fixed to the seating portion 20 is seated in the doghouse 14 to frictionally retain the magnetic pin 12 in the doghouse 14. The polymeric body 19 of the magnetic pin 12 also includes a cylindrical-shaped insert portion 24 integrally extending from the seating portion 20 and oppositely directed with respect to the metallic insert 22, the cylindrical-shaped insert portion 24 slidably received in an obround slot 26 of the vehicle structural member 18 to releasably connect the doghouse 14 and the component 16 to the vehicle structural member 18.

Figure 4:
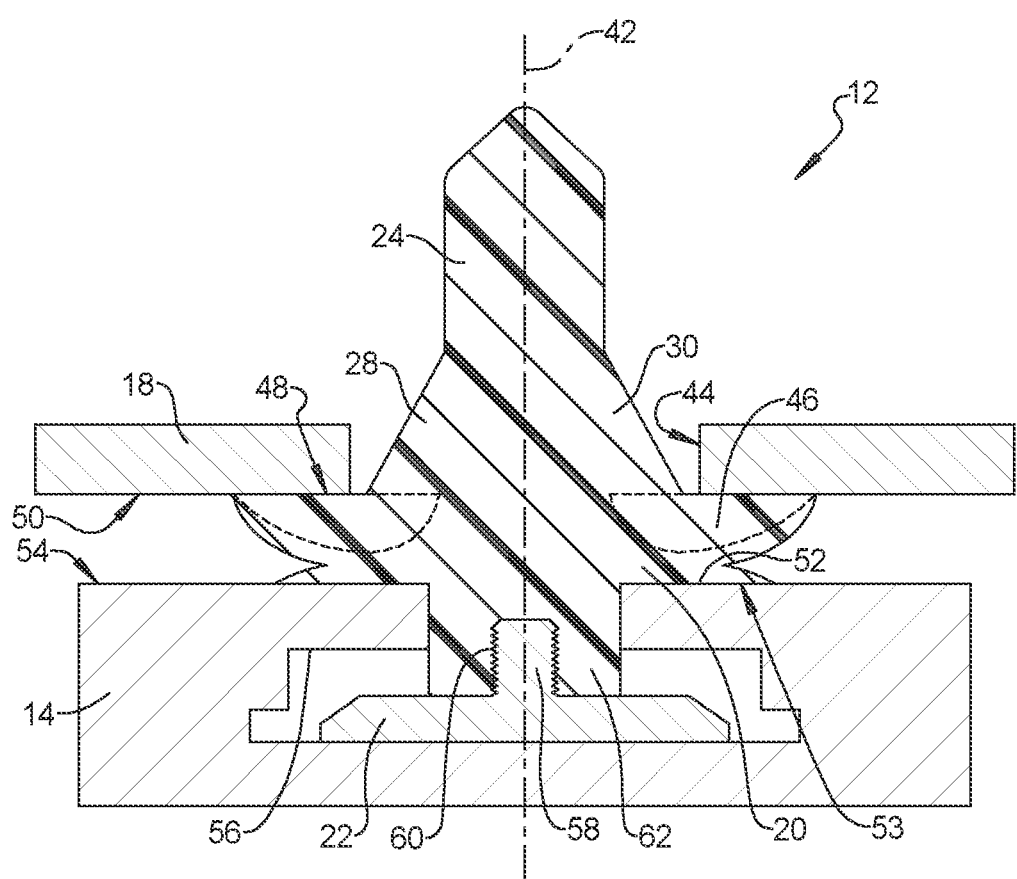
FIG. 4 is a front elevational cross-sectional view taken at section 4 of FIG. 1.

Referring to FIG. 2 and again to FIG. 1, additional features of the polymeric body 19 of the magnetic pin 12 include a first locking wing 28 and a second locking wing 30 oppositely positioned about the insert portion 24 with respect to the first locking wing 28. The first locking wing 28 and the second locking wing 30 include a seating surface 32 oriented parallel to and spaced from the seating portion 20 by a tubular section 34 of the insert portion 24. A circular-shaped raised ring 36 may be provided which extends outwardly from the tubular section 34. According to several aspects the polymeric body 19 includes the insert portion 24, the first and second locking wings 28, 30, the tubular section 34, the raised ring 36 and the seating portion 20, all or which are integrally connected and formed together in a co-molding process of a polymeric material including but not limited to polyoxymethylene and polyamide materials. The metallic insert 22 is formed independently of the polymeric body 19 and is formed of a metal having magnetic properties such as but not limited to a carbon steel and a nickel material. The metallic insert 22 may be fixed to the polymeric body 19 of the magnetic pin 12 during molding as discussed in greater detail in reference to FIG. 4.

Figure 2:
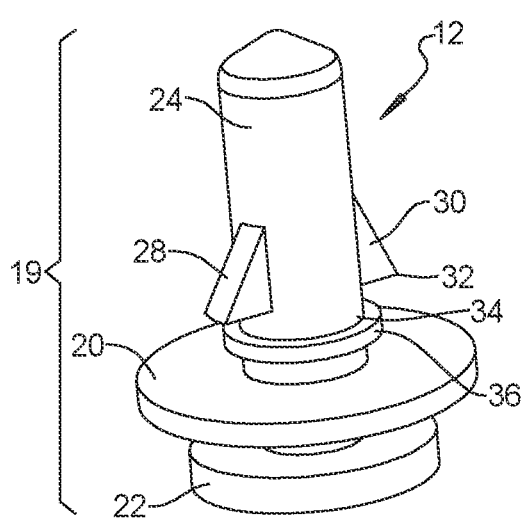
FIG. 2 is a front perspective view of the magnetic pin of FIG. 1.

Referring to FIG. 3 and again to FIGS. 1 and 2, a magnetic pin 38 defines a modified aspect of the magnetic pin 12 and further includes a flexible, umbrella-shaped apron 40. The apron 40 may be made of the polymeric material of the polymeric body 19 of the magnetic pin 12 or may define a different polymeric material having greater elastic flexibility. The apron 40 seats against the seating portion 20 and opens toward the first and second locking wings 28, 30. The apron 40 may be used to increase a seating area in contact with the vehicle structural member 18 and may be used to improve alignment contact with the vehicle structural member 18.

Figure 3:
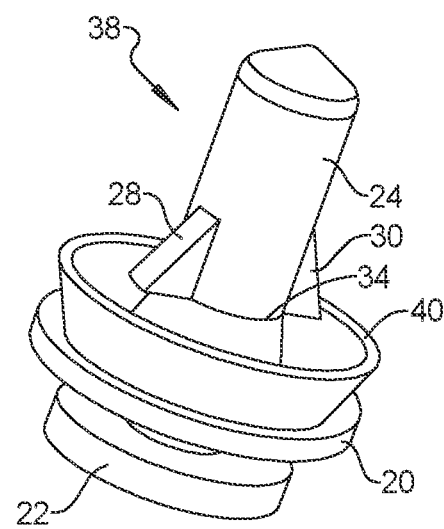
FIG. 3 is a front perspective view of a magnetic pin of another aspect of the present disclosure.

Referring to FIG. 4 and again to FIGS. 1 through 3, the magnetic pin 12 provides additional features which aid in use and mating with the vehicle structural member 18. The first and second locking wings 28, 30 are oppositely arranged on the insert portion 24 with respect to a longitudinal central axis 42 of the magnetic pin 12, with the central axis 42 also defining an insertion axis for the magnetic pin 12 into the obround slot 26. A width of the first and second locking wings 28, 30 are predefined to slidably fit within an elongated portion 44 of the obround slot 26 of the vehicle structural member 18. A lock spring 46 defines a first segment of the seating portion 20. The lock spring 46 elastically deflects during contact of a seating face 48 of the seating portion 20 with a member face 50 of the vehicle structural member 18. A positioning spring 52 defines a second segment of the seating portion 20. The positioning spring 52 elastically deflects during contact of a contact face 53 of the seating portion 20 with a doghouse face 54 of the doghouse 14.

The metallic insert 22 is received in a cavity 56 of the doghouse 14 sized to restrict removal of the metallic insert 22. The metallic insert 22 incudes a male attachment member 58 received in a distal end 62 of the insert portion 24. The male attachment member 58 may include a frictional feature 60 including but not limited to raised ribs, multiple teeth, raised rings, and the like which fixedly couple the male attachment member 58 and thereby the metallic insert 22 to the insert portion 24. According to several aspects the metallic insert 22 is attached to the distal end 62 of the insert portion 24 during molding of the insert portion 24.

Referring to FIG. 5 and again to FIGS. 1 through 4, during an initial stage of assembly of the magnetic pin 12 the metallic insert 22 is seated in the doghouse 14 such that a combination of the magnetic pin 12 and the doghouse 14 are moved in an installation direction 64 which slides the insert portion 24 into the elongated portion 44 of the vehicle structural member 18. The magnetic pin 12 is moved until the seating face 48 of the seating portion 20 directly contacts the member face 50 of the vehicle structural member 18 defining a pre-installed position of the magnetic pin 12. The first and second locking wings 28, 30 slidably extend into the elongated portion 44 of the obround slot 26.

Figure 5:
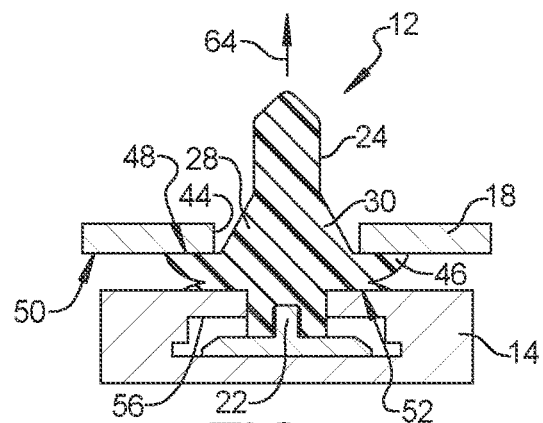
FIG. 5 is a front elevational view of the assembly of FIG. 4.

Referring to FIG. 6 and again to FIGS. 1 through 4, with the magnetic pin 12 in the pre-installed position shown in FIG. 5 an induction tool 66 is slid over an outer surface 68 of the doghouse 14 in opposed directions 70 with an induction coil 72 energized. An induction field 74 generated by the induction coil 72 generates a signal when the induction field 74 contacts and thereby locates the metallic insert 22. An initial clearance 76 between the vehicle structural member 18 and the doghouse 14 is obtained with the magnetic pin 12 in the pre-installed position.

Figure 6:
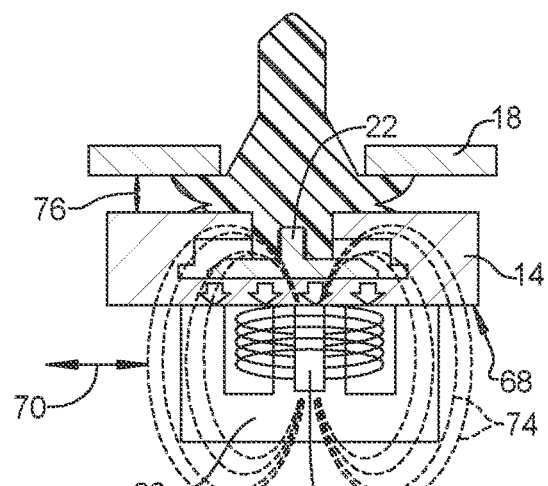
FIG. 6 is a front elevational view of the assembly of FIG. 5 further showing an induction tool used to locate the magnetic pin.

Referring to FIG. 7 and again to FIG. 6, with the magnetic pin 12 in the pre-installed position the installer applies pressure to the magnetic pin 12 and the doghouse 14 in a direction 78 similar to the installation direction 64. This application of pressure compresses the seating portion 20 between the vehicle structural member 18 and the doghouse 14, reducing the initial clearance 76 to an installed clearance 80 less than the initial clearance 76 and displacing the first and second locking wings 28, 30 such that the seating surface 32 is above an outer surface 82 of the vehicle structural member 18. An electric motor 84 is positioned over the induction tool 66. The electric motor 84 will automatically energize when the signal indicating presence of the metallic insert 22 is generated. A magnetic coupler 86 positioned over the induction tool 66 the metallic insert 22 and magnetically coupled to the metallic insert 22 is rotated by operation of the electric motor 84 which induces a 90-degree rotation of the magnetic coupler 86 and thereby the metallic insert 22. Rotation of the metallic insert 22 also rotates the first and second locking wings 28, 30 as shown and described in reference to FIG. 10 to position the seating surface 32 of the first and second locking wings 28, 30 into direct contact with the outer surface 82 of the vehicle structural member 18 lock the magnetic pin 12 in a locked position shown.

Figure 7:
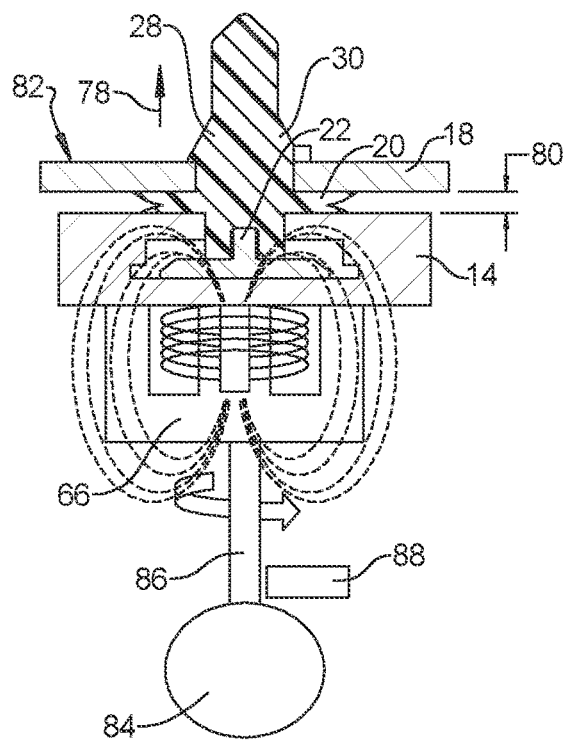
FIG. 7 is a front elevational view of the assembly of FIG. 6 further showing an electrical motor for rotating the magnetic pin and a position sensor.
Figure 8:
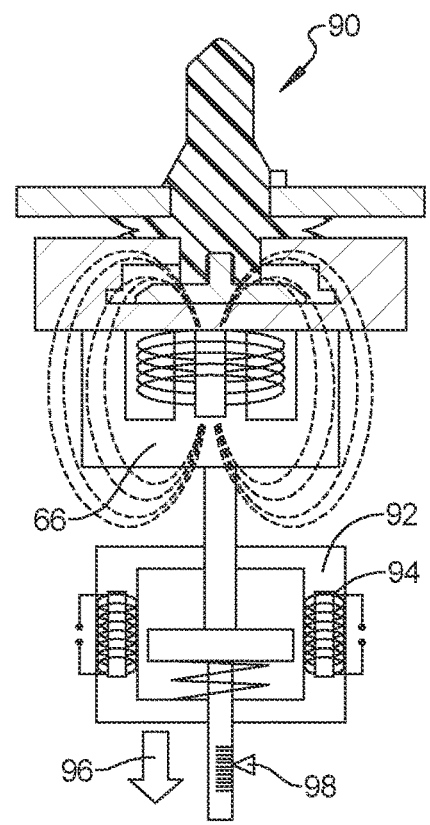
FIG. 8 is a front elevational view of the assembly of FIG. 6 further showing an induction tool used to locate the magnetic pin.

Referring to FIG. 8 and again to FIG. 7, with the magnetic pin 12 in the locked position a verification operation 90 is performed. A magnetic tool 92 is positioned over the induction tool 66 replacing the electric motor 84. A magnetic field is generated through the magnetic tool 92 by energizing a coil 94. Displacement of the magnetic pin 12 in a removal direction 96 which is compared to a predetermined maximum allowable displacement 98. If the magnetic pin 12 displacement is less than the predetermined maximum allowable displacement 98 the magnetic pin 12 is properly installed. If the magnetic pin 12 displacement exceeds the predetermined maximum allowable displacement 98 the magnetic pin 12 is not properly installed and correction is required.

Referring to FIG. 9 and again to FIG. 5, to position the magnetic pin 12 in the pre-installed position the insert portion 24 is inserted into the obround slot 26 of the vehicle structural member 18 such that the first locking wing 28 is directed toward a first end wall 95 of the obround slot 26 and the second locking wing 30 is directed toward a second end wall 97 of the obround slot 26. The first end wall 95 and the second end wall 97 are spaced further apart from each other than a spacing between a first side wall 99 and an opposed second side wall 100 of the obround slot 26. The reduced spacing between the first side wall 98 and the second side wall 100 allows engagement by the first and second locking wings 28, 30 in the installed position of the magnetic pin 12 shown and described in FIG. 10.

Figure 9:
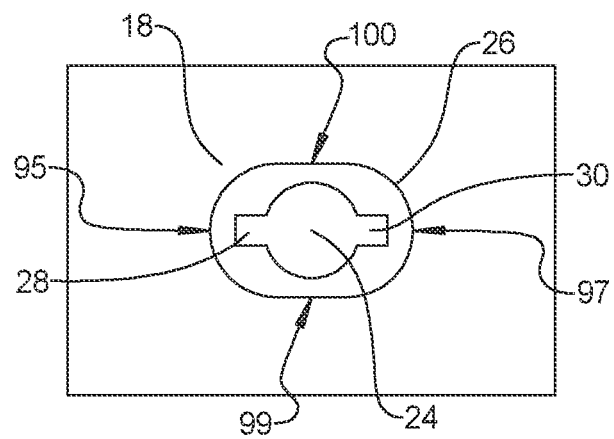
FIG. 9 is a top plan view of the assembly of FIG. 5 in a pre-installed position.
Figure 10:
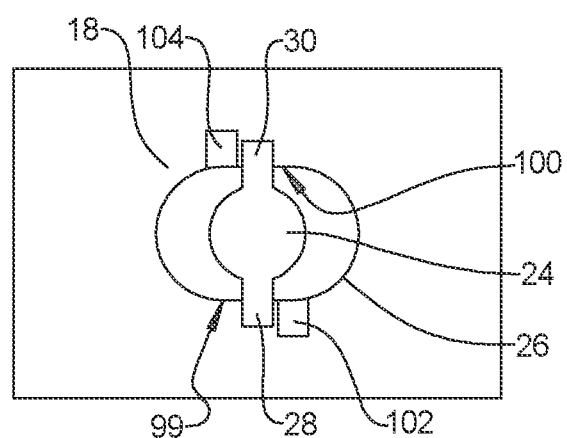
FIG. 10 is a top plan view modified from FIG. 9 to show the magnetic pin after rotation to a locked position.

Referring to FIG. 10 and again to FIG. 9, the installed position of the magnetic pin 12 is shown. As the insert portion 24 is rotated by 90-degrees from the pre-installed position shown in FIG. 9 to the installed position, the first and second locking wings 28, 30 rotate to positions extending beyond the first side wall 99 and the second side wall 100. This position precludes withdrawal of the insert portion 24 in a direction away from the viewer as shown in FIG. 10. According to further aspects, a first molded stop 102 and a second molded stop 104 are pre-molded onto the vehicle structural member 18 and act as positive stops against rotation of the first and second locking wings 28, 30 in the installed position of the magnetic pin 12.

The present rotary locking system with a magnetic function to lock/unlock the magnetic pin 12 allows easier part replacement to manage warranties, obsolescence or service. The present rotary locking system also allows door panel adjustability for flow lines to pillars and includes a slot to pass through the fastener wings when the vehicle part is installed.

Because the retention features, the first and second locking wings 28, 30, are not deformed during installation and removal of the component, minimum wear or damage of the magnetic pin 12 occurs through service cycles, and retention capability is not degraded.

According to several aspects, a molded in umbrella may be added to manage potential alignment between the magnetic pin 12 and mating parts using the umbrella as a flexible member or spring. A magnetic tool is used to lock and unlock the magnetic pin with 12 and an inductive sensor may be operated to locate a magnetic pin position on a front loaded component. The magnetic pin 12 incudes a plastic pin body having locking wings to lock the magnetic pin 12 to the mating part. A lock spring defines a portion of a plastic skirt or the body of the magnetic pin, and a positioning spring is also integral to the magnetic pin 12 together with the metallic insert 22 which permits the magnetic pin 12 to be located in the plastic part by the inductive sensor and then actuated by a magnetic field coming from magnetic tool.

Features are provided which are integral to the pin or to the mating part which avoid potential failure modes such as pin incorrect installation, pin misalignment to the mating slot, and pin lack of retention due to under-rotation or over-rotation.

A magnetic pin and system of the present disclosure offers several advantages. These include a rotary locking system with a magnetic function to lock/unlock the fastener. The present system allows door panel adjustability (U/D) and provides for minimum wear or damage to the component when serviced. The present system adapts to different component geometry and is not limited to installation on straight component lines. The rotating magnetic pin of the present disclosure is a positive rotating fastener with a metallic insert which is activated with a magnetic tool to lock and unlock the component. The rotating magnetic pin of the present disclosure presents no appearance degradation because the magnetic pin is not visible in use and does not use a cover. The present magnetic pin exhibits a very low sliding insertion effort and provides high retention force, up to approximately 500N for example if mounted on sheet metal to withstand side impact loads. The present magnetic pin reduces fastener scrap at a plant or dealership, reduces cost of component replacement such as under warranty.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A magnetic pin, comprising:
   a polymeric body including:
   a seating portion;
   a cylindrical-shaped insert portion integrally fixed to the seating portion;
   a first locking wing integrally connected to the insert portion and a second locking wing oppositely positioned about the insert portion with respect to the first locking wing and integrally connected to the insert portion; and
   a lock spring defining a first segment of the seating portion, the lock spring elastically deflecting during contact of a seating surface of the seating portion with a vehicle structural member to engage the seating portion against the vehicle structural member; and
   a metallic insert fixed to the seating portion, wherein the metallic insert is susceptible to a magnetic field applied to the metallic insert acting to co-rotate the metallic insert and the polymeric body to install and to remove the polymeric body from an in-use position.

2. The magnetic pin of claim 1, wherein the first locking wing and the second locking wing include a seating surface oriented parallel to and spaced from the seating portion by a tubular section of the insert portion.

3. The magnetic pin of claim 2, further including a circular-shaped raised ring extending outwardly from the tubular section.

4. The magnetic pin of claim 3, wherein the insert portion, the first locking wing and the second locking wing, the tubular section, the raised ring and the seating portion are integrally connected as a co-molding of a polymeric material.

5. The magnetic pin of claim 1, further including a positioning spring defining a second segment of the seating portion, the positioning spring elastically deflecting to engage the seating portion during contact of a contact face of the seating portion with a doghouse face.

6. The magnetic pin of claim 1, further including a flexible, umbrella-shaped apron of a polymeric material seating against the seating portion and opening toward the first locking wing and the second locking wing.

7. The magnetic pin of claim 1, wherein the first locking wing and the second locking wing are oppositely arranged on the insert portion with respect to a longitudinal central axis of the magnetic pin, with the central axis also defining an insertion axis of the magnetic pin.

8. The magnetic pin of claim 1, wherein the metallic insert incudes a male attachment member received in a distal end of the insert portion, the male attachment member including a frictional feature including one of raised ribs, multiple teeth and raised rings which fixedly couple the male attachment member and thereby the metallic insert to the insert portion.

9. The magnetic pin of claim 1, wherein the metallic insert is a metal having magnetic properties including and not limited to a carbon steel and a nickel material.

10. A magnetic pin system, comprising:
    a magnetic pin having a polymeric body including:
    a seating portion;
    a cylindrical-shaped insert portion integrally fixed to the seating portion; and
    a first locking wing integrally connected to the insert portion and a second locking wing oppositely positioned about the insert portion with respect to the first locking wing and integrally connected to the insert portion;
    a metallic insert fixed to the seating portion, wherein the metallic insert is susceptible to a magnetic field applied to the metallic insert acting to co-rotate the metallic insert and the polymeric body to install and to remove the polymeric body from a fixed position; and
    a magnetic coupler positioned over the metallic insert and magnetically coupled to the metallic insert, the magnetic coupler rotated to induce a 90-degree rotation of the magnetic coupler and thereby the metallic insert.

11. The magnetic pin system of claim 10, wherein the magnetic pin is seated in a doghouse, with the doghouse fixed to a component.

12. The magnetic pin system of claim 11, further including a cavity of the doghouse sized to frictionally restrict removal of the metallic insert when the metallic insert is received in the cavity of the doghouse to frictionally couple the metallic insert to the doghouse.

13. The magnetic pin system of claim 12, wherein a combination of the magnetic pin and the doghouse are moved in an installation direction, with the magnetic pin moved until the seating face of the seating portion directly contacts a member face of a vehicle structural member defining a pre-installed position of the magnetic pin.

14. The magnetic pin system of claim 13, wherein in the pre-installed position of the magnetic pin the first locking wing and the second locking wing slidably extend into an elongated portion of an obround slot created in the vehicle structural member.

15. The magnetic pin system of claim 14, further including a magnetic coupler positioned over the metallic insert and magnetically coupled to the metallic insert, the magnetic coupler rotated by operation of an electric motor inducing a 90-degree rotation of the magnetic coupler and thereby 90-degree rotation of the metallic insert.

16. The magnetic pin system of claim 15, further including a seating surface of the first locking wing and the second locking wing, wherein rotation of the metallic insert rotates the first locking wing and the second locking wing until the seating surface directly contacts a member face of the vehicle structural member to position the magnetic pin in a locked position.

17. A method to couple an automobile vehicle component to a vehicle structural member, comprising:
    molding a magnetic pin having a polymeric body including a seating portion and a cylindrical-shaped insert portion integrally fixed to the seating portion;
    oppositely positioning a first locking wing and a second locking wing about the insert portion with the first locking wing and the second locking wing integrally connected to the insert portion;
    fixing a metallic insert to the seating portion;
    inserting the insert portion into an aperture formed in a vehicle structural member;
    positioning a magnetic coupler over the metallic insert to magnetically couple the magnetic coupler to the metallic insert; and
    rotating the magnetic coupler to induce a 90-degree rotation of the magnetic coupler and thereby to induce a 90-degree rotation of the first locking wing and the second locking wing to lock the magnetic pin to the vehicle structural member.

18. The method of claim 17, further including fixing a doghouse to a vehicle component, the doghouse having a cavity.

19. The method of claim 18, further including inserting the metallic insert into the cavity of the doghouse to couple the magnetic pin to the vehicle component prior to inserting the insert portion into the aperture.

* * * * *